(12) United States Patent
Brioschi

(10) Patent No.: US 8,083,036 B2
(45) Date of Patent: Dec. 27, 2011

(54) METHOD FOR MANUFACTURING CALLIPERS FOR DISC BRAKES WITH FORCED CAP

(75) Inventor: Cesare Brioschi, Galbiate LC (IT)

(73) Assignee: Sunstar Engineering Pte. Ltd., Singapore (SG)

( * ) Notice: Subject to any disclaimer, the term of this patent is extended or adjusted under 35 U.S.C. 154(b) by 651 days.

(21) Appl. No.: 12/155,103

(22) Filed: May 29, 2008

(65) Prior Publication Data
US 2009/0014260 A1 Jan. 15, 2009

(30) Foreign Application Priority Data
May 31, 2007 (IT) .............................. MI2007A1109

(51) Int. Cl.
*F16D 65/20* (2006.01)
(52) U.S. Cl. ................. 188/73.1; 188/73.46; 188/73.47; 188/370
(58) Field of Classification Search ............... 188/73.1, 188/73.46, 73.47, 370
See application file for complete search history.

(56) References Cited

U.S. PATENT DOCUMENTS

| | | | | |
|---|---|---|---|---|
| 6,367,595 B1* | 4/2002 | Mori et al. | .................. | 188/73.1 |
| 2002/0166736 A1* | 11/2002 | Yunba | .......................... | 188/72.5 |
| 2007/0199772 A1* | 8/2007 | Nanri et al. | .................. | 188/71.1 |

FOREIGN PATENT DOCUMENTS

| | | | | |
|---|---|---|---|---|
| GB | 1387833 A | * | 3/1975 | |
| GB | 2131507 A | * | 6/1984 | |

* cited by examiner

Primary Examiner — Bradley King
(74) Attorney, Agent, or Firm — Jacobson Holman PLLC

(57) ABSTRACT

A method for manufacturing callipers for disc brakes. The calliper includes a body in which cylindrical chambers are formed inside which pistons run bearing pads intended for acting on the disc of the brake during the braking step. The method includes the steps of providing a body provided with a slit intended for receiving the disc of the brake and with a pair of cavities aligned transversely to the slit on opposite sides of the slit. The cavities are intended for forming a pair of cylindrical chambers. One of the cavities has a first opening on the slit and a second opening to the outside of the body at which there is a tapered portion with a decreasing section towards the outside of the body. Closing the second opening is a cap applied in the cavity by the slit. The cap has a tapered portion that is forced at the tapered portion of the second opening to form a cylindrical chamber of the calliper.

8 Claims, 1 Drawing Sheet

METHOD FOR MANUFACTURING CALLIPERS FOR DISC BRAKES WITH FORCED CAP

BACKGROUND OF THE INVENTION

1. Field of the Invention

The present invention relates to an innovative method for manufacturing callipers of disc brakes, in particular for motorcycles.

2. State of the Prior Art

In the motorcycle industry making monolithic callipers is known that are intended to act on the disc of the brake to achieve braking. The callipers comprise a monolithic body obtained through die-casting, which is provided with a slit that in use receives the periphery of the disc of the brake. In the body, four chambers are typically formed that are open towards the slit and face in couples opposite sides of the slit. The chambers house four corresponding pistons that hold the pads of the brake and cooperate in pairs to pinch the braking disc.

Different methods have been proposed for making this type of calliper, which are nevertheless generally complicated, costly and sometimes do not enable callipers to be obtained that are reliable in the event of high operating pressure. According to a known technique, a monolithic body is initially obtained through die-casting with two aligned cylindrical cavities, intended to make the chambers of two cylinders of the calliper on opposite sides of the slit receiving the disc of the brake.

One of the two cavities has a closed bottom, whilst the other one has a bottom with an opening passing through to the outside of the calliper, which is formed in the body to facilitate machining of the internal surfaces of the chambers.

After machining, the opening has to be closed with a cap, which can be applied to the body of the calliper in various manners, for example by screwing, or by using an elastic clip.

Known solutions for applying the cap, can, however, be unreliable in the event of great operating pressure and may require expensive machining of the workpieces.

Further, in order to obtain a good seal, it is generally necessary to use washers between the cap and monolithic body, which increases the complexity of the calliper structure, increasing the manufacturing costs of the product.

The general object of the present invention is to overcome the aforesaid drawbacks by providing a method for manufacturing callipers for disc brakes that is simple and cheap, and which enables a calliper to be obtained that provides long-term reliability and is able to support high operating pressure in the chambers.

SUMMARY OF THE INVENTION

In view of this object, it has been decided to devise, according to the invention, a method for manufacturing callipers for disc brakes of the type comprising a body in which there are formed cylindrical chambers inside which pistons slide bearing pads intended for acting on the disc of the brake during braking, the method comprising the steps of:

providing a body provided with a slit intended for receiving the disc of the brake and of a pair of cavities aligned transversely on the slit on opposite sides of the slit intended for forming a pair of cylindrical chambers, one of said cavities having a first opening on the slit and a second opening on the outside of the body at which there is a tapered portion with a section decreasing towards the outside of the body, closing said second opening with a cap applied in the cavity by the slit, the cap having a tapered portion that is forced at the tapered portion of the second opening to form a cylindrical chamber of the calliper.

BRIEF DESCRIPTION OF THE DRAWINGS

In order to make clearer the explanation of the innovative principles of the present invention and the advantages thereof over the prior art, with the help of the attached drawings a possible embodiment applying such principles will be illustrated by way of example. In the drawings.

DETAILED DESCRIPTION OF THE INVENTION

Figure 1:
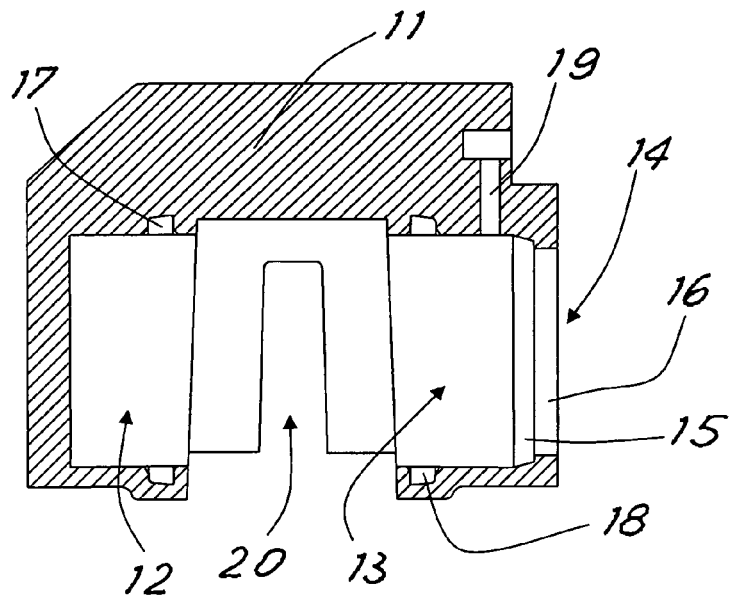
FIG. 1 is a section view of a body intended for making the body of the calliper, before the chamber-closing cap is applied.

With reference to the figures, initially there is supplied a metal body 11 according to the method, which body 11 is obtained, for example, by die-casting and is intended for making the body of the calliper of the disc brake (FIG. 1). The body 11 has a central slit 20, intended in use to receive the disc of the brake, and a pair of aligned cavities 12, 13 intended to form the cylindrical chambers of the calliper inside which the pistons slide that bear the brake pads acting on the disc (which pads are not shown in figure).

The cavities 12, 13 have an extent that is transverse to the plane of the slit 20 and are arranged facing one another on opposite sides of the slit 20.

The cavity 13, in addition to having an opening at the slit 20, has an opening 14 at the opposite end facing the outside of the body 11 of the calliper.

At the opening 14, the cavity 13 is provided with a tapered perimeter portion 15, with a section decreasing towards the outside of the body of the calliper. Serially to the portion 15, the cavity has a cylindrical portion 16, on the external side of the body 11. Upstream of the tapered portion 15, on the side facing the slit 20, the cavity has a cylindrical shape. In this cylindrical portion, intended for receiving the piston of the calliper, there is formed a groove 18 that in use receives a sealing washer (not shown in figure).

The cavity 12 is cylinder-shaped, and also this is provided with a groove 17 for receiving a sealing washer between the chamber and the piston.

In the body 11 channels 19 are also formed for supplying oil to the chambers of the calliper, which channels 19 can be made according to any known prior art.

Figure 2:
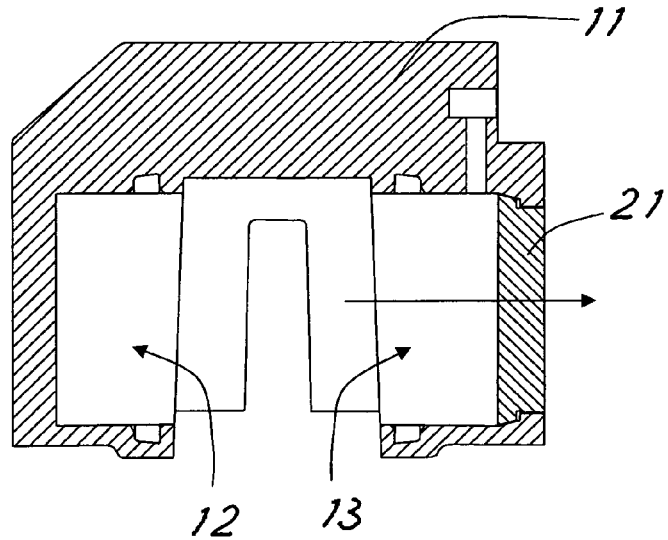
FIG. 2 is a section view that is similar to the preceding one, where the closing cap of the chamber of the calliper has been applied.

In FIG. 2 there is shown a further step in the process of manufacturing the calliper, where the cap 21 is applied to the body 11 to shut the opening 14 on the bottom of the cavity 13.

The cap 21 is inserted into the cavity from the inside, or from the slit 20, and has a tapered portion 22 (shown clearly in the enlargement in FIG. 3) that engages by forcing the conical portion 15 formed in the body 11.

In FIG. 2 the cap insertion and forcing direction, which is axial in relation to the cavity 13, is indicated by an arrow.

The cap 21 also has a cylindrical portion 23, which is complementary to the cylindrical portion 16 of the body and is suitable for engaging therein when the tapered portion 22 is forced into the respective seat 15.

Figure 3:
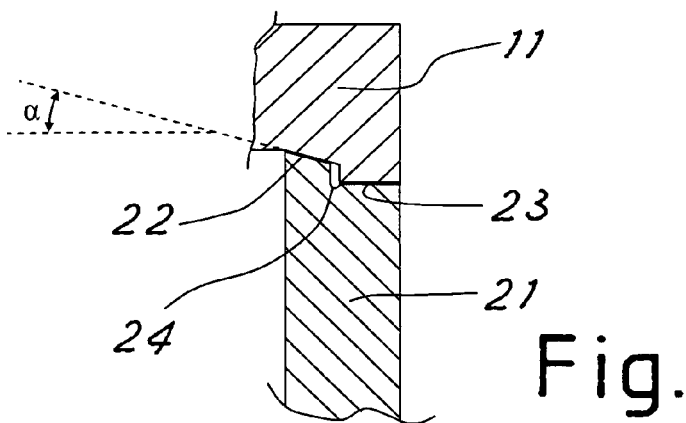
FIG. 3 is an enlargement of a detail of the forced coupling between the cap and the body of the calliper.

It has been found to be particularly advantageous to make the tapered portions 22 and 15 with conical surfaces, preferably having a tilt α with respect to the axis of the cavity 14 comprised between 3° and 5° (FIG. 3).

The above tilt enables a mechanical coupling to be obtained that is sufficiently strong to ensure that the cap 21 withstands even great operating pressure inside the calliper without giving towards the outside of the calliper.

Advantageously, between the conical portion 22 and the cylindrical portion 23, on the cap there is a groove 24, at which the cap is not in contact with the body 11 of the calliper, as shown in the figure.

Before applying the cap 21, the internal surfaces of the cavities 12, 13 are machined using a tool inserted into the body of the calliper through the opening 14.

Once the cap has been applied by forcing, preferably, an external surface machining can be performed, so as to make the external surface of the calliper homogenous and flat at the cap.

In a preferred embodiment of the invention, in the calliper two pairs of facing chambers are formed; for each pair of chambers, one of the two cavities can be formed initially with a through hole on the bottom, to be reclosed with the cap applied by forcing.

Forcing is preferably performed hot. It may possibly be possible to apply epoxy glues at the cap and body parts that are engaged.

At this point it is clear how the objects of the present invention have been achieved.

In particular, a method has been provided for manufacturing a calliper for disc brakes that is rapid and cheap.

Applying the cap for forcing enables a calliper to be obtained that is capable of operating reliably, even at relatively high operating pressure of the fluid in the chambers.

Further, the structure of the calliper is particularly simple, it not being necessary to insert sealing washers or use rings or elastic clips to keep the cap in position.

Machining of the internal parts of the monolithic body is facilitated by the presence of the opening on the bottom of the cavity, and closing of the opening with the cap is rapid and inexpensive as a simple forcing task is performed.

The calliper according to the invention does not have to be provided with threading to fit the cap, with consequent simplification of the manufacturing process.

Naturally, the description made above of an embodiment applying the innovative principles of the present invention is given by way of example of these innovative principles and must not therefore be taken to limit the scope of what is claimed herein.

What is claimed is:

1. Method for manufacturing callipers for disc brakes of the type comprising a body in which there are formed cylindrical chambers inside which pistons slide bearing pads intended for acting on the disc of the brake during braking, the method comprising the steps of:

providing a body having a slit intended for receiving the disc of the brake and with a pair of cavities, aligned transversely to the slit on opposite sides of the slit and intended for forming a pair of cylindrical chambers, one of said cavities having a first opening on the slit and a second opening on the outside of the body at which said one of the cavities has a tapered portion with a section decreasing to the outside of the body, providing a cap designed to be applied in said one of the cavities from the slit for closing said second opening to form a cylindrical chamber of the calliper, the cap having a tapered portion adapted to correspond to the tapered portion of the second opening, and applying the cap to the second opening by forcing the tapered portion of the cap into contact with the tapered portion of the second opening to obtain a forced coupling between the tapered portion of the cap and the tapered portion of the second opening in an absence of sealing washers between the body and the cap, the cap having a perimeter groove located between the conical portion and the cylindrical portion, the groove avoiding contact with a wall of said one of the cavities when the cap is applied by forcing the tapered portion of the cap into contact with the tapered portion of the second opening.

2. Method according to claim 1, wherein the tapered portion of the cap and the tapered portion of said one of the cavities have conical surfaces to form a respective conical portion of the cap and of the one cavity.

3. Method according to claim 2, wherein the surfaces of the tapered portions have a tilt between 3° and 5° compared with an axial direction of said one of the cavities.

4. Method according to claim 1, wherein the body is obtained by die-casting and is machined on the surfaces of the cavities with a tool inserted through said second opening before the cap is applied.

5. Method according to claim 2, wherein said one of the cavities has a cylindrical portion that is serial to the conical portion towards the outside of the body of the calliper, the cap having a cylindrical portion that is complementary to the cylindrical portion of said one of the cavities and that is suitable for engaging therein when the cap is forced into the second opening of the one cavity.

6. Method according to claim 1, wherein external surface machining is performed at the external face of the cap after forcing of the cap.

7. Calliper for disc brakes made using a method according to claim 1.

8. Method for manufacturing callipers for disc brakes of the type comprising a body in which there are formed cylindrical chambers inside which pistons slide bearing pads intended for acting on the disc of the brake during braking, the method comprising the steps of:

providing a body provided with a slit intended for receiving the disc of the brake and with a pair of cavities aligned transversely to the slit on opposite sides of the slit intended for forming a pair of cylindrical chambers, one of said cavities having a first opening on the slit and a second opening on the outside of the body at which there is a tapered portion with a section decreasing to the outside of the body, and closing said second opening with a cap applied in the cavity by the slit, the cap having a tapered portion that is forced coupled at the tapered portion of the second opening to form a cylindrical chamber of the calliper, the tapered portions of the cap and of the cavity having conical surfaces, the tapered portions having a tilt between 3° and 5° compared with an axial direction of the cavity, the cap having a perimeter groove located between the conical portion and a cylindrical portion, the groove avoiding contact with a wall of said one of the cavities when the cap is applied by forcing the tapered portion of the cap into contact with the tapered portion of the second opening.

* * * * *